United States Patent
Saito et al.

[15] 3,704,358
[45] Nov. 28, 1972

[54] SUBMERGED-ARC BOTH-SIDE BUTT WELDING METHOD OF A SQUARE GROOVE

[72] Inventors: Tatsuo Saito, Kobe; Kozo Akahide; Teruo Ukebe, both of Chiba, all of Japan

[73] Assignee: Kawasaki Steel Corporation, Fukiai-ku, Kobe, Japan

[22] Filed: Nov. 23, 1971

[21] Appl. No.: 201,340

[30] Foreign Application Priority Data

Dec. 14, 1970 Japan ....................45/110804

[52] U.S. Cl. .....................219/73, 219/137, 219/126
[51] Int. Cl. ...........................................B23k 9/18
[58] Field of Search........219/73, 101, 102, 104, 137, 219/126

[56] References Cited

UNITED STATES PATENTS

| 3,320,402 | 5/1967 | Cunningham | 219/137 |
| 3,351,734 | 11/1967 | Arikawa et al. | 219/137 |
| 3,497,667 | 2/1970 | Howlett et al. | 219/73 X |
| 3,456,089 | 6/1969 | Shrubsall | 219/73 |

*Primary Examiner*—J. V. Truhe
*Assistant Examiner*—Dale R. Peterson
*Attorney*—Fleit, Gipple & Jacobson

[57] ABSTRACT

A method for submerged-arc welding of a square butt joint from opposite surfaces thereof, by using tandem electrodes. The tandem electrodes are moved at 50 to 120 cm/min, relative to the joint, while passing a current $I_1$ of 1,000 to 2,000 amperes through the leading electrode, while keeping the trailing electrode current $I_2$ to one-fourth to four-fifths of $I_1$ and the arc voltage of the leading electrode at $(I_1/40)+15$ to $(I_1/40)+35$ volts. The welding operations from the opposite surfaces are conducted under similar conditions.

8 Claims, 7 Drawing Figures

SUBMERGED-ARC BOTH-SIDE BUTT WELDING METHOD OF A SQUARE GROOVE

This invention relates to a method for submerged-arc butt welding of square groove from opposite surfaces thereof, and more particularly to a submerged-arc welding method of a square butt joint from opposite surfaces thereof by using tandem electrodes, which method is suitable for welding comparatively thick steel plates, for instance, steel plates with a thickness of 12 mm or more.

There are two different butt welding methods; namely, a both-side welding method including the welding from opposite surfaces of a joint, and a one-side welding method including the welding from only one surface of a joint. The former method has been widely used heretofore, while the latter method has recently been developed.

With the latter method of welding from only one surface of the joint, it is possible to eliminate the process of turning over the joint or plates being welded, so that an assembly line type welding system can be employed in a factory building with a comparatively low roof. On the other hand, with this one-side welding method, the device necessary for it becomes costly, and the cross sectional area of the groove to be welded is so wide that the amount of welding material consumed in each groove becomes very large. Furthermore, the one-side welding method tends to deteriorate the toughness of the weld metal and heat affected zone.

The both-side welding method has increasingly been used, because it has the following advantages; namely, thick metallic plates can be processed effectively by submerged-arc welding based on such both-side method, and no special skill is required except the need of turning over the plates being welded for welding the opposite surfaces thereof. Furthermore, with the both-side welding method, the possibility of causing cracks is comparatively low, and complicated auxiliary equipments necessary for one-side welding can be dispensed with.

Although various geometrical shapes can be employed at the edge of plates to be welded, depending on the properties of the flux used and the quality required for the welded joint, most commonly used edge shapes are as follows; namely, square groove for metallic plates of up to 12 mm thickness, single-V groove with broad root face for metallic plates of 12 mm to 16 mm thickness, and double-V groove for plates of thicker than 16 mm. The use of the square groove is usually limited to plates of up to 12 mm thickness, because the square butt joint for metallic plates thicker than about 12 mm tends to make it difficult to produce good weld beads. More particularly, in the case of the both-side single-pass welding, the depth of bead penetration must be at least one half of the thickness of the plates being welded, and such depth of the bead penetration is proportional to the magnitude of the welding current through the welded joint. If the beam penetration is deepened without expanding its width, the weld bead becomes pear-like cross-sectional shape, which shape is highly susceptible to hot cracks at its central portion. The inventors have confirmed by tests that the risk of generating hot cracks is high when the (bead width)/(bead penetration depth) ratio is smaller than 0.8. Thus, when a higher welding current is used for deepening the bead penetration, some means must be used for widening that weld bead, for instance, by reducing the welding speed.

Accordingly, when thick metallic plates are joined by butt welding, the welding process must be carried out comparatively slowly with a high electric current. It is known that the amount of reinforcement For the weld bead per unit length of the bead, which Is formed by the molten metal from electrodes, increases in proportion to the magnitude of the welding current and in inverse proportion to the welding speed. Thus, when a high welding current is used for welding at a low speed, the reinforcement becomes excessively large, for instance, the height of the reinforcement sometimes amounts to about 5 mm or more, and the appearAnce and shape of the weld beads become inferior. The excessively large reinforcement also causes undesirable defects in the weld beads, such as overlaps. Due to the foregoing reasons, the thickness of metallic plates to be welded with square groove has heretofore been limited to 12 mm or less.

In comparing the square groove with the double-V groove, the former is apparently superior to the latter as far as the time for edge preparation and the dimenSional accuracy are concerned. More particularly, to make the double-V groove, either precise gas cutting or precise mechanical planing is required. On the other hand, to make the square groove, either shearing machine or stack cutting by gas can be utilized effectively.

In terms of the welding cost, the amount of weld metal required for welding square groove is much Smaller than the amount of weld metal to be filled in the V-shaped gaps of the double-V groove sections, so that the square groove is more economical than the double-V groove.

Therefore, an object of the present invention Is to obviate the aforesaid difficulties of the conventional submerged-arc both-side butt welding method of Square groove. With the welding method according to the present invention, metallic plates having a thickness of up to 30 mm can be joined with deeply penetrated beads formed shapely between the square edges of the plates by traveling tandem electrodes at a comparatively high speed. The tandem electrodes include a leading electrode, which carries a high current at a comparatively high voltage, and a trailing electrode carrying a current suitable for making the top surface of each reinforcement flat.

According to the present invention, there is provided a submerged-arc both-side butt welding method of square groove of steel plates by using tandem electrodes, comprising steps of abutting the square groove of steel plates in alignment with each other; applying flux material to one-side surface of the groove thus abutted; moving an electrode assembly through the flux at a speed of 50 to 120 cm/min relative to the plates, said electrode assembly consisting of a leading electrode and a trailing electrode disposed behind the leading electrode, relative to the direction of the electrode assembly; passing an electric current $I_1$ through the leading electrode to the plates and another electric current $I_2$ through the trailing electrode to the plates, while moving said electrode assembly at said speed, said $I_1$ being 1,000 to 2,000 amperes with a leading electrode arc voltage of $\{(I_1/40)+15\}$ volts to $\{(I_1/40)+35\}$ volts, said $I_2$ being one fourth to four fifths of $I_1$; and repeating said flux application and said movement of the electrode assembly for the opposite Side surface of the abutted square groove, in a similar fashion to said one-side.

As pointed out in the foregoing, the use of square groove for welding comparatively thick steel plates, for instance, steel plates of thicker than about 12 mm, tends to result in (1) a defective bead shape, which is highly susceptible to cracks, and (2) excessively high reinforcement. In order to mitigate such difficulties, the inventors have carried out a series of studies and tests. As a result, the inventors have found out that the bead shape to be formed by a tandem electrode assembly can mostly be controlled by regulating the current, the voltage, and the traveling Speed of the leading electrode of the tandem electrode assembly, and the aforesaid difficulties of known submerged-arc welding with square groove can be mitigated by such findings of the inventors. More particularly, A comparatively high electric current is fed to the square groove through the leading electrode so as to ensure deep penetration. The arc voltage of the leadIng electrode is kept comparatively high, because the Inventors found hat a high arc voltage at the leading electrode produces a wide bead and prevents the crack formation in the bead. Consequently, according to the present invention, arc voltage of the leading electrode is kept considerably higher than that of leading electrode in conventional submerged-arc welding method. With such a high leading electrode arc voltage, the Weld bead is broadened, so that the welding speed can be increased. As a result, the amount of weld metal deposited from electrodes per unit length of the square groove joint can properly be selected so as to produce reinforcement of reasonable height, e.g., 3 mm to 4 mm high reinforcement beads.

The trailing electrode to be used in the welding method according to the present invention serves to supply a suitable amount of heat to the molten metal formed by the leading electrode, for slowing the cooling rate of the molten metal to produce uniformly shaped beads. The trailing electrode also acts to reduce the angle $\alpha$ of contact between the surface of the plates being welded and the curved surface of beads.

In short, the present invention is based on the synergistic effects of three factors; namely, a suitable current at the leading electrode at a comparatively high arc voltage, a comparatively high welding speed, and a proper current at the trailing electrode. With such synergistic effects, a highly practical submerged-arc both-side butt welding of square groove of thick steel plates has become possible.

The magnitude of the current $I_1$ through the leading electrode of the tandem electrode assembly, according to the present invention, is restricted to be 1,000 amperes to 2,000 amperes, because a leading electrode current $I_1$ in short of 1,000 amperes cannot produce a sufficiently deep penetration for the both-side square butt welding of steel plates with a thickness of not smaller than 12 mm, while a leading electrode current $I_1$ in excess of 2,000 amperes generates so high arc pressure that the molten metal for welding Is splashed to deteriorate the bead quality.

The restriction on the arc voltage of the leading electrode of the tandem electrode assembly presents one of the most unique characteristics of the present invention. The arc voltage of the leading electrode in known submerged-arc welding means is 30 volts to 40 volts, but the arc voltage of the leading electrode of the tandem electrode assembly according to the present invention is to be $(I_1/40)+15$ volts to $(I_1/40)+35$ volts. In other words, according to the Present invention, the arc voltage of the leading electrode is never allowed to become below 40 $(=1,000/40+15)$ volts under any operating conditions. If the leading electrode arc voltage is lower than $(I_1/40)+15$ volts, the bead width becomes insufficient and the reinforceMent becomes too high, for instance, in excess of 4 mm. Judging from test results, reinforcements with a height of greater than 4 mm are impractical and such excessively high reinforcements tend to generate undercuts. On the other hand, if the leading electrode arc voltage is higher than $(I_1/40)+35$ volts, the bead penetration is quickly reduced and the deep penetration necessary for the welding of thick steel plates cannot be achieved.

For a better understanding of the invention, reference is made to the accompanying drawings, in which.

In order to determine the relation between the bead penetration depth and the arc voltage of a leading electrode in a submerged-arc welding process, tests were made by using a tandem electrode assembly consisting of a leading electrode and a trailing electrode. Test conditions were as follows.

| | |
|---|---|
| Trailing electrode current, $I_2$: | 600 amperes |
| Trailing electrode arc voltage, $V_2$: | 45 volts |
| Welding speed: | 70 cm/min |
| Leading electrode current, $I_1$: | 1,000 amperes and 1,500 amperes |
| Type of welding: | Submerged-arc both-side butt welding with square groove |

Figure 1:
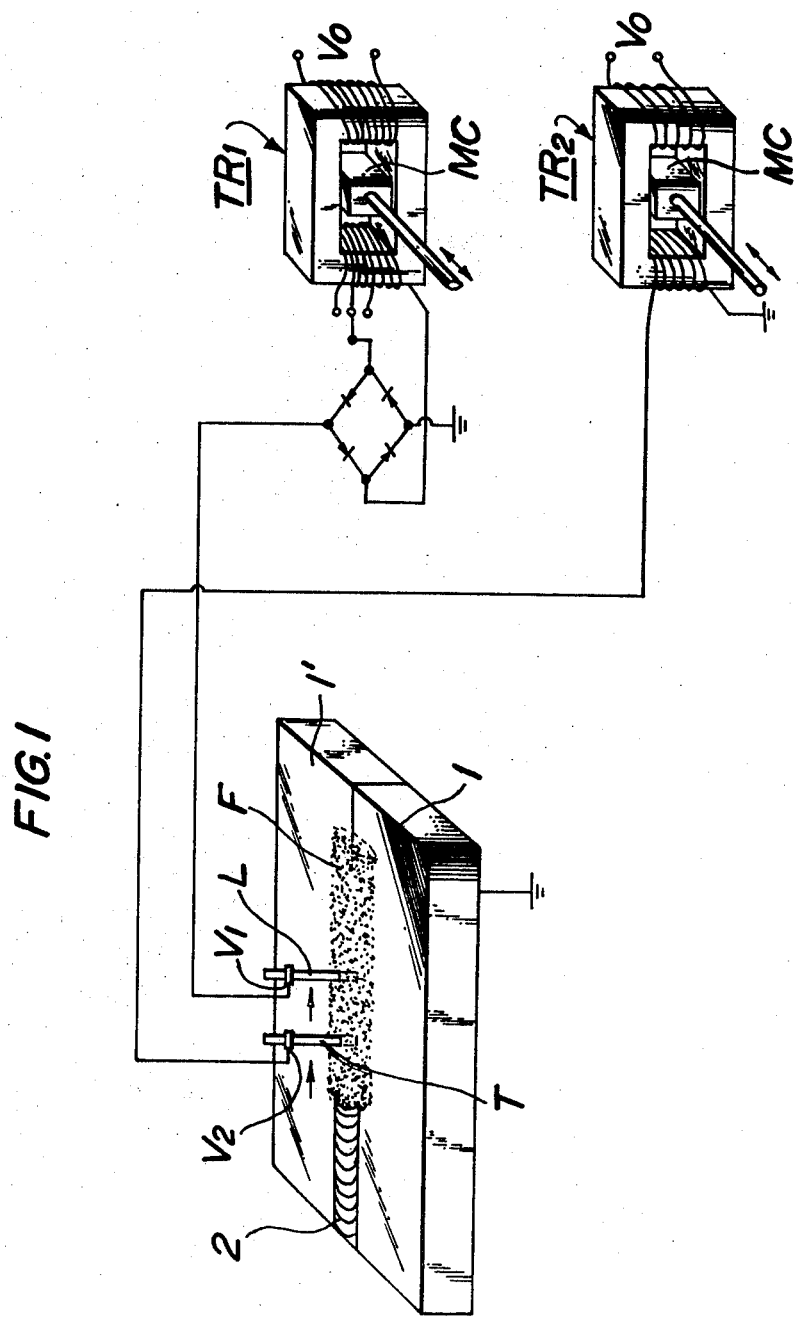
FIG. 1 is a circuit diagram of a welding means, which is usable for fulfilling the welding method according to the present invention.

The electric circuit used for the tests is schematically shown in FIG. 1. The primary windings Of two welding transformers TR1 and TR2 are connected to a power source voltage $V_0$, respectively. The secondary winding of the welding transformer TR1 is connected to a leading electrode L through a rectifier, so as to establish a leading electrode arc voltage $V_1$. This invention Is not restricted to the use of such rectifier, and A.C. power source can directly be connected to the leading electrode for welding. The secondary winding of the other welding transformer TR2 is connected to the trailing electrode T for establishing its arc voltage $V_2$. Each of the welding transformers TR1 and TR2 has a movable core MC, which can be actuated by a suitable means (not shown), e.g., as shown by the arrows of the figure, for modifying the leakage reactance of the transformer. In response to such modification of the leakage reactance, the welding current through the electrode L or T is changed.

In FIG. 1, two steel plate, and 1' are abutted, by directly bringing the square edges of the two plates in contact with each other. A suitable flux material F is placed on the square groove, and a tandem electrode assembly, consisting of the leading electrode L and the trailing electrode T, moves through the flux, e.g., in the direction as shown by the arrow of the Figure. By feeding suitable welding currents through the tandem electrode assembly, a weld bead 2 is formed along the square groove of the two plates 1 and 1'.

Figure 2:
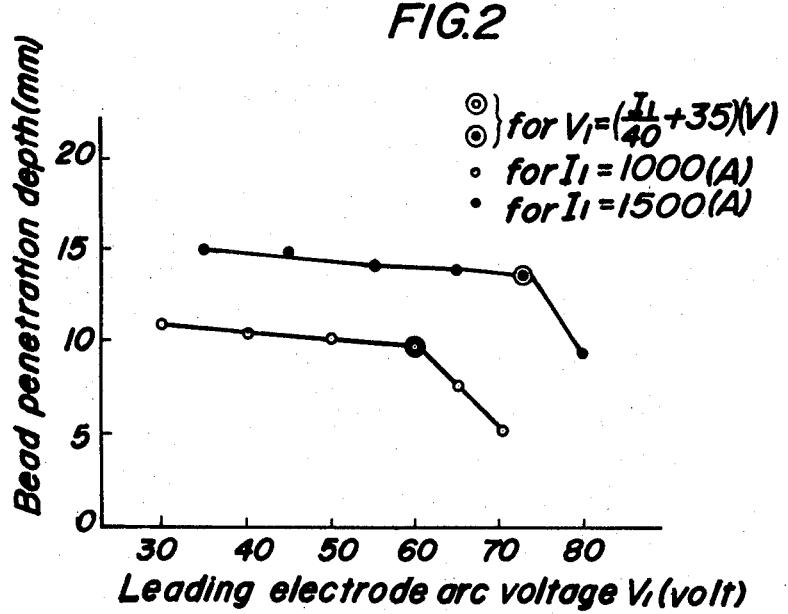
FIG. 2 is a graph showing the relation between the bead penetration depth and the leading electrode arc voltage, in a submerged-arc both-side butt welding method; according to the present invention.

The results are shown in FIG. 2. As is evident in FIG. 2, the welding penetration gradually decreases as the leading electrode arc voltage increases, and when the leading electrode arc voltage exceeds the level of $(I_1/40)+35$ volts $I_1$ being the leading electrode current expressed in amperes, the bead penetration depth quickly diminishes with a slight increase of the leading electrode arc voltage. As long as the leading electrode arc voltage is higher than a certain minimum level but lower than the aforesaid level of $(I_1/40)+35$ volts, the variation of the bead penetration depth in response to the fluctuation of the leading electrode arc voltage is so small that it is negligible for any practical purPoses. The preferable range of the leading electrode arc voltage $V_1$ is $(I_1/40)+25$ volts.

Similar tests were carried out at different welding speeds, namely, the moving speed of the tandem electrode assembly relative to the joint to be welded. If the welding speed is slower than 50 cm/min, the bead width does not expand in proper ratio with the rapid increase of the amount of the reinforcement. As a result, the height of the reinforcement per se becomes too high, for instance, in excess of 4 mm. The welding speed faster than 120 cm/min is too fast to ensure sound beads, and for instance, results in undercuts. Thus, the welding speed of the submerged-arc both-side butt welding method according to the present invention must fall in a range of 50 cm/min to 120 cm/min. The preferable range of the welding speed is 50 cm/min to 90 cm/min.

Figure 3A:
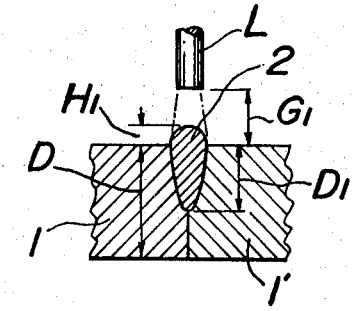
FIGS. 3A and 3B are schematic sectional views of weld beads, showing the principles of the present Invention.

It was found by the inventors that the configuration of the weld bead is substantially determined by the operating conditions of the leading electrode L. Referring to FIG. 3A, the penetration D1 of the bead B For welding the plates 1, 1' of thickness D, by the both-side welding of the present invention, should preferably be at least D/2. It has been known that the penetration D1 per se increases, as the welding current through the leading electrode L becomes higher. The more increase of the welding current, however, results in a too narrow bead B, accompanied with an excessively large height $H_1$ for the reinforcement, as shown in FIG. 3A. Both the narrowness of the bead B And the highness of the reinforcement are not desirable, as pointed out in the foregoing.

Figure 3B:
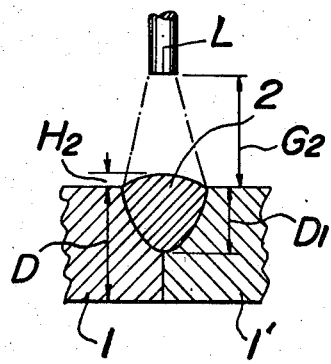

The inventors have noticed that the fact that the Width of the bead 2, as seen in FIGS. 3A and 3B, can be broadened by increasing the gap between the edges of the Plates plates 1' to be welded and the leading electrode L, because the molten metal from the electrode can be more widely spread by increasing the gap, for instance, from G1 of FIG. 3A to G2 of FIG. 3B. To maintain the flow of the molten metal with the increased gap, the arc voltage of the leading electrode L must be increased. In fact, With the increase gap, a higher arc voltage is necessary for the leading electrode L, for maintaining a given current therethrough, as compared with the leading electrode arc voltage for a smaller gap.

It is another finding of the inventors that the height of the reinforcement can be reduced by increasing the gap between the groove and the leading electrode L, for instance from H1 of FIG. 3A to H2 of FIG. 3B. Such reduction of the reinforcement height is a natural outcome of the aforesaid widening of the bead 2.

Figure 4:
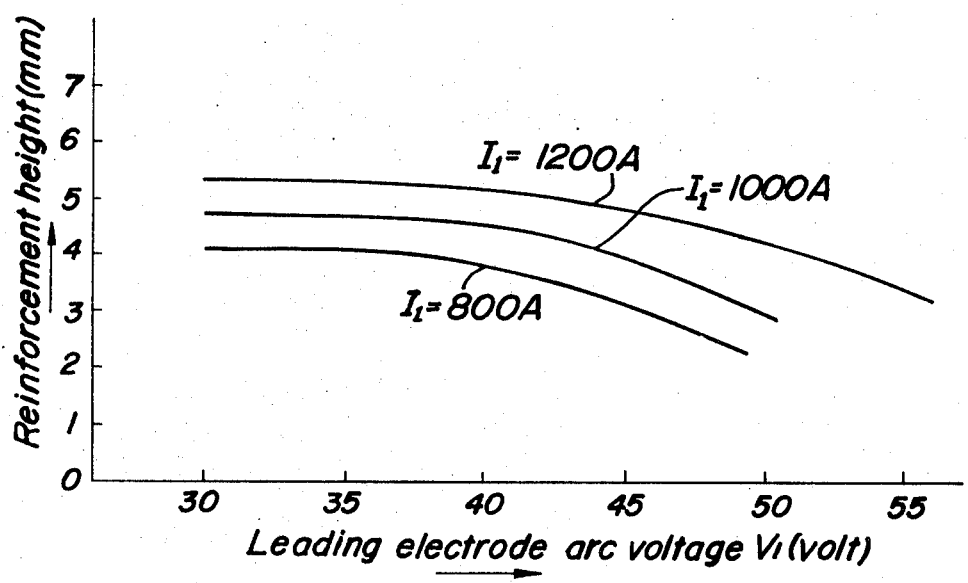
FIG. 4 is a graph showing the relation between the reinforcement height and the leading electrode voltage.

FIG. 4 shows the relation of the reinforcement height and the arc voltage. As the gap between the groove and the electrode increases, the arc voltage increases, provided that the current through the electrode and the welding speed are kept constant. Consequently, the height of the bead reinforcement tends to diminish as the arc voltage increases.

By properly combining leading electrode arc voltage with the welding speed of the tandem electrode assembly and the trailing electrode current, the desired synergistic effects of the present invention can be achieved.

Figure 6:
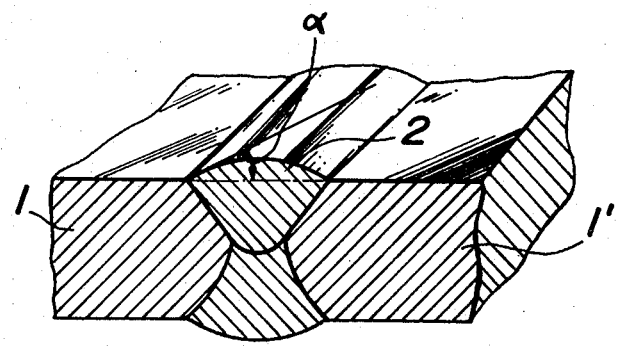
FIG. 6 is a sectional view of a welded portion of two steel plates which are welded by the method according to the present invention.

The trailing electrode acts to reheat the metal melted by the leading electrode, so as to slow down its cooling rate. As a result, by properly selecting the current through the trailing electrode, uniformly shaped weld beads can be achieved, while ensuring a proper contact angle $\alpha$. What is meant by the contact angle $\alpha$ is the dihedral angle between the curved surface of the bead 2 and the plane of the base plate 1 at the toe of the bead, as shown in FIG. 6. More particularly, the contact angle $\alpha$ is defined between the planar surface of the base plate 1 and a tangential plane of the top surface of the bead 2 at the intersection of the bead surface with the base plate surface, which angle includes the top portion of the bead 2. The small contact angle $\alpha$ reduces the risk of undercut, and improves the quality of the weld bead 2.

The inventors have found that the contact angle $\alpha$ can be minimized when the current $I_2$ through the trailing electrode is selected to be one fourth to four fifths of the leading electrode current $I_1$, i.e., $I_2=(1/4 \text{ to } 4/5)I_1$.

The trailing electrode voltage $V_2$ is determined, e.g., by tests under conditions satisfying the aforesaid requirements on the leading electrode voltage $V_1$ and current $I_1$, as well as the trailing electrode current $I_2$, so that satisfactory bead shape can be achieved.

Figure 5:
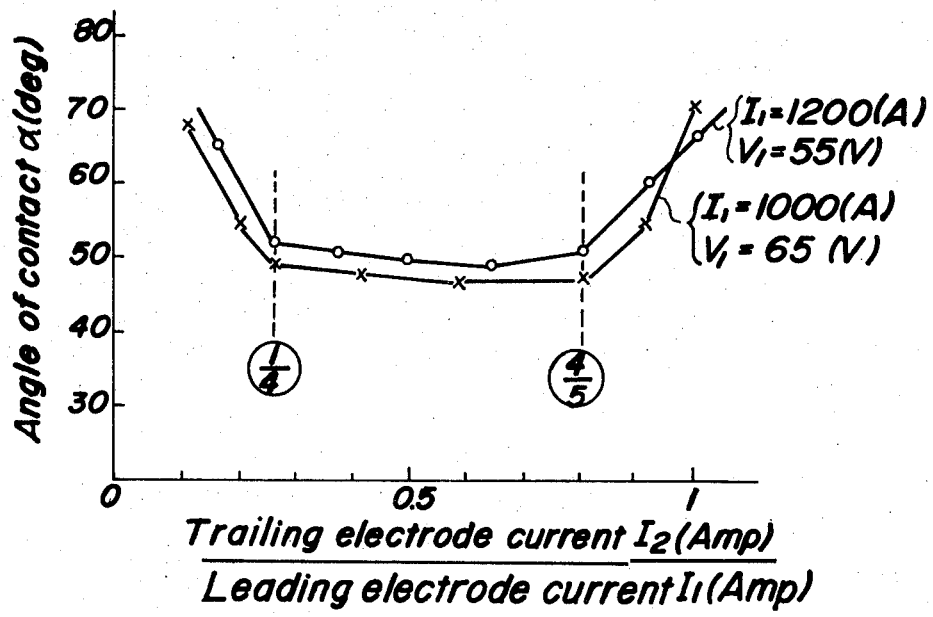
FIG. 5 is a graph showing the relation between the angle of contact $\alpha$ of the weld bead with the steel plate being welded and the ratio of the current $I_1$ through a leading electrode to the current $I_2$ through a trailing electrode.

A series of tests were made on the relation between the contact angle $\alpha$ and the $I_2/I_1$ ratio. The results are shown in FIG. 5. In the figure, circular marks (o) represent the result obtained under conditions of the leading electrode current $I_1=1,200$ A, the leading electrode arc voltage $V_1=55$ V and the travel speed $S=70$ cm/min, while the cross marks (x) represent the result obtained under conditions of the leading electrode current $I_1=1,000$ A, the leading electrode arc voltage $V_1=65$ V, and the travel speed $S=50$ cm/min.

It is apparent from FIG. 5 that the contact angle $\alpha$ is minimized when the aforesaid $(I_2/I_1)$ ratio falls in the range of one-fourth to four-fifths, and the contact angle $\alpha$ increases when the $(I_2/I_1)$ ratio becomes smaller than or larger than the aforesaid range of one-fourth to four-fifths. More particularly, when the trailing electrode current $I_2$ is smaller than one-fourth of the leading electrode current $I_1$, the reheating effect of the trailing electrode current $I_2$ is insufficient, so that the beads obtained with such small $I_2$ become similar to those obtained with single electrode, i.e., with the leading electrode alone. Consequently, for such a comparatively small trailing electrode current $I_2$, the configuration of the weld bead tends to become irregular and to cause large contact angle $\alpha$, so that the risk of undercut increases. On the other hand, with the trailing electrode current $I_2$ in excess of $(4/5)I_1$, the thermal input to the bead excessively increases without increasing the bead width, so that the amount of the deposited metal per unit length of the bead tends to become too large. As a result, the height of the reinforcement increases, resulting in a large contact angle $\alpha$. Especially, when the trailing electrode current $I_2$ is two fifths to three fifths of the leading electrode current $I_1$, excellent bead appearance of more uniform shape can be achieved.

The driving electric power source to be applied to the leading and trailing electrodes, according to the welding method of the present invention, can be an A.C. source, a D.C. source using straight or reverse polarity, or a combination of A.C. and D.C. sources.

It is an important feature of the present invention that, in welding two metal plates with square groove from both sides, a certain welding speed can be used for both surfaces of the plates. With conventional submerged-arc welding, two different welding speeds are used for welding opposite surfaces of metal plates, and the selection of welding speed ratios for the opposite surfaces of the metal plates required considerable experience and skill. Thus, the present invention contributes greatly to the art of submerged arc welding by eliminating the need of such special skill of operators.

The welding method according to the present invention will now be described in further detail, by referring to Examples.

EXAMPLE 1

Two steel plates of 50 Kg/mm² tensile strength class with the chemical compositions of Table 1, as defined in Japanese Industrial Standard JIS G 3106, each being 18 mm thick, were directly abutted through square groove, i.e., with 0 mm gap, and the two plates were joined by submerged-arc welding while using low-manganese wire electrode (4.8 mm dia.) together with bonded basic flux mainly consisting of alumina, magnesia, lime stone, and silica. A leading electrode was actuated by a D.C. power source in reverse by an A.C. power source, as shown in FIG. 1.

TABLE 1

|  | C | Si | Mn | P | S | Fe |
|---|---|---|---|---|---|---|
| Percentage | 0.18 | 0.39 | 1.45 | 0.020 | 0.023 | Balance |

Both the backing surface and the finishing surface of the steel plates were welded under the same welding conditions, which were as follows.

| | |
|---|---|
| Leading electrode voltage: | 50 volts |
| Leading electrode current: | 1,250 amperes |
| Trailing electrode voltage: | 45 volts |
| Trailing electrode current: | 500 amperes |
| Spacing between the two electrodes: | 30 mm |
| Welding speed: | 180 cm/min |

Satisfactory penetration was achieved, with a bead reinforcement of 20 to 23 mm width and 2.8 to 3.0 mm height. The contact angle $\alpha$ of the bead reinforcement was 49° to 51°, which was highly satisfactory. According to the results of X-ray tests of the welded joint, it was free from any defects; namely, it was free from insufficient penetration, crackings, slag inclusions, and blowholes.

Various tests were made on the welded joint thus obtained, and excellent mechanical properties of the welded joint was proved; namely, tensile strength was 55 Kg/mm², and Charpy's impact value $E_o$ of weld metal was 6.2 Kg-m. It was proved by a guide bend test that the welded joint had a highly ductility and was free from any cracks or other defects when it was bent at 180°.

EXAMPLE 2

Two mild steel plates with the chemical composition of Table 2, as defined by JIS G 3101, each being 28 mm thick, were abutted through square groove with a gap of 0 to 3 mm, and the two plates were joined by submerged-arc welding while using low-manganese wire electrode together with bonded flux similar to Example 1 but having a higher silica content. The diameter of the electrode was 6.4 mm for the leading electrode, and 4.8 mm for the trailing electrode, and both of the two electrodes were actuated by an A.C. power source.

TABLE 2

|  | C | Si | Mn | P | S | Fe |
|---|---|---|---|---|---|---|
| Percentage | 0.19 | trace | 0.94 | 0.008 | 0.0032 | Balance |

Both the backing surface and the finishing surface of the steel plates were welded under the following welding conditions.

Backing surface:

| | |
|---|---|
| Leading electrode voltage: | 65 volts |
| Leading electrode current: | 1,600 amperes |
| Trailing electrode voltage: | 50 volts |
| Trailing electrode current: | 600 amperes |
| Spacing between the two electrodes: | 60 mm |
| Welding speed: | 60 cm/min |

Finishing surface:

| | |
|---|---|
| Leading electrode voltage | 67 volts |
| Leading electrode current: | 1,700 amperes |

| | |
|---|---|
| Trailing electrode voltage: | 50 volts |
| Trailing electrode current: | 600 amperes |
| Spacing between the two electrodes: | 60 mm |
| Welding speed: | 60 cm/min |

Satisfactory beads were achieved, with a bead reinforcement of 35 to 37 mm width and 3.4 to 3.7 mm height. The contact angle $\alpha$ of the bead reinforcement was 48° to 53°, which was highly satisfactory.

The penetration was 16 mm deep from either surface, and the penetrations from the opposite surfaces formed a lap of about 4 mm at the inner ends thereof.

Various tests were made on the welded joint thus obtained, and excellent mechanical properties of the welded joint was proved; namely tensile strength was 48 Kg/mm$^2$, and Charpy's impact values $E_0$ of weld metal was 8.6 Kg-m near the surface of the head and 9.2 Kg-m at the central portion. It was proved by a side bend test that the welded joint had a high ductility and free from any cracks or other defects when it was bent. According to the results of X-ray tests of the welded joint, it was free from any defects; namely, it was free from insufficient penetration, cracking, slag inclusions, and blowholes.

Thus, sound welded joints were obtained for comparatively thick steel plates by the method according to the present invention.

What is claimed is:

1. A submerged-arc both-side butt welding method of square grooves between steel plates by using tandem electrodes, comprising the steps of
    abutting the square edges of steel plates in alignment with each other;
    applying flux material to one-side surface of the groove thus abutted;
    moving an electrode assembly through the flux at a speed of 50 to 120 cm/min relative to the plates, said electrode assembly consisting of a leading electrode and a trailing electrode disposed behind the leading electrode, relative to moving direction of the electrode assembly;
    passing an electric current $I_1$ through the leading electrode to the plates and another electric current $I_2$ through the trailing electrode to the plates, while moving said electrode assembly at said speed, said $I_1$ being 1,000 to 2,000 amperes with a leading electrode arc voltage of $\{(I_1/40)+15\}$ volts to $\{(I_1/0)+35\}$ volts, said $I_2$ being one fourth to four fifths of $I_1$; and
    repeating said flux application and said movement of the electrode assembly for the opposite side surface of the abutted square groove, in a similar fashion to said one-side.

2. A submerged-arc both-side butt welding method according to claim 1, wherein the thickness of the steel plates to be welded is not smaller than 12 mm.

3. A submerged-arc both-side butt welding method according to claim 1, wherein said current $I_2$ through the trailing electrode is two fifths to three fifths of said current $I_1$ through the leading electrode.

4. A submerged-arc both-side butt welding method according to claim 1, wherein said leading electrode carries an alternating electric current, and said electrode assembly travels at 50 to 90 cm/min relative to the joint being welded.

5. A submerged-arc both-side butt welding method according to claim 1, wherein said leading electrode carries a direct electric current.

6. A submerged-arc both-side butt welding method according to claim 1, wherein the arc voltage $V_1$ of said leading electrode is $\{(I_1/40)+15\}$ volts to $\{(I_1/40)+25\}$ volts.

7. A submerged-arc both-side butt welding method according to claim 4, wherein the arc voltage $V_1$ of said leading electrode is $\{(I_1/40)+15\}$ volts to $\{(I_1/40)+25\}$ volts.

8. A submerged-arc both-side butt welding method according to claim 5, wherein the arc voltage $V_1$ of said leading electrode is $\{(I_1/40)+15\}$ volts to $\{(I_1/40)+25\}$ volts.

* * * * *

UNITED STATES PATENT OFFICE
CERTIFICATE OF CORRECTION

Patent No. 3,704,358     Dated November 28, 1972

Inventor(s) Saito et al.

It is certified that error appears in the above-identified patent and that said Letters Patent are hereby corrected as shown below:

Column 10, line 8, change "$(I_1/0)$" to read -- $(I_1/40)$ --

Signed and sealed this 16th day of April 1974.

(SEAL)
Attest:

EDWARD M. FLETCHER, JR.
Attesting Officer

C. MARSHALL DANN
Commissioner of Patents